March 5, 1968  R. L. HEINRICH ET AL  3,372,147
PRODUCTION OF THERMOSETTING AROMATIC-FORMALDHYDE RESINS
Filed Dec. 21, 1964  3 Sheets-Sheet 1

FIG. 1.

INVENTORS.
RAYMOND L. HEINRICH,
BY JOHN M. POWERS,

*Sylvester H. Brock, Jr.*

ATTORNEY.

March 5, 1968 R. L. HEINRICH ET AL 3,372,147
PRODUCTION OF THERMOSETTING AROMATIC-FORMALDHYDE RESINS
Filed Dec. 21, 1964 3 Sheets-Sheet 2

INVENTORS.
RAYMOND L. HEINRICH,
JOHN M. POWERS,
BY
ATTORNEY.

March 5, 1968 R. L. HEINRICH ET AL 3,372,147
PRODUCTION OF THERMOSETTING AROMATIC-FORMALDHYDE RESINS
Filed Dec. 21, 1964 3 Sheets-Sheet 3

INVENTORS.
RAYMOND L. HEINRICH,
JOHN M. POWERS,
BY
ATTORNEY.

3,372,147
PRODUCTION OF THERMOSETTING AROMATIC-FORMALDEHYDE RESINS
Raymond L. Heinrich and John M. Powers, Baytown, Tex., assignors, by mesne assignments, to Esso Research and Engineering Company, Elizabeth, N.J., a corporation of Delaware
Filed Dec. 21, 1964, Ser. No. 419,720
13 Claims. (Cl. 260—67)

ABSTRACT OF THE DISCLOSURE

Thermosettable resins of high oxygen content are produced by reacting an aromatic hydrocarbon and formaldehyde in the presence of an acid catalyst under specific conditions to produce a liquid hydrocarbon phase which is separated and subjected to neutralization and vacuum distillation under specific conditions to obtain a thermosettable resin as a bottoms product.

---

The present invention relates to the production of aromatic-formaldehyde condensation products (hereinafter generically referred to as AF resins) which, in the presence of an acid catalyst, can be thermoset to produce an infusible resin product. By the practice of the present invention, an aromatic hydrocarbon is reacted with formaldehyde in the presence of a strongly acidic catalyst at moderate-to-high temperatures in order to obtain a condensation product which is then steam distilled or fractionated under a vacuum at an essentially neutral or slightly basic pH in order to obtain a resin product containing from 7% to 20% oxygen. Where the aromatic hydrocarbon is toluene, the resin product is hereinafter referred to as "Polytol"; where the aromatic hydrocarbon is xylene, the resin product is hereinafter referred to as "Polyxyl." The particulars of the present invention will be more clearly understood by reference to the following discussion and to the drawings, wherein:

The present invention is directed to the production of aromatic-formaldehyde resins which may be thermoset. The thermosetting resin can be used in many fields including the production of moulded, vacuum-formed, extruded, or otherwise mechanically formed objects; surface coatings; and adhesives. Specifically, the thermosetting resin can be used as an adhesive in the production of plywood, particle board, paper board, etc., in casting and molding compounds, in laminates, surface coatings (as in modified alkyds), as a binder such as is utilized in the production of abrasive wheels, as an impregnating resin for wood and paper, as a foundry resin, and other numerous similar uses.

In general, the thermosetting resin of the present invention is similar in preparation and in its properties to the phenolic resins prepared from phenols and formaldehyde. The thermosetting resin of the present invention is superior to the phenolic resins, however, since the substituent on the aromatic nucleus is the stable and unreactive methyl group rather than the reactive and unstable hydroxyl group which is present in the phenol resin. It is therefore more resistant to heat, moisture, and other deterioration influences.

The aromatic hydrocarbons which may be employed in the present invention are the methyl-substituted aromatics such as toluene, xylenes, trimethyl or tetramethyl benzenes, as well as methylated compounds of the naphthalene series or of higher condensed ring aromatic series. It is necessary only that two or more aromatic hydrogen atoms be present on the aromatic ring or group of rings so that methylene bridging and other linking may take place during the condensation reaction to obtain a high molecular weight material. In the case of the xylenes, it has been found that metaxylene is far more reactive than ortho- or paraxylene, and although the three isomers of xylene in admixture with ethyl benzene (as is commonly obtained in refinery operations) can be utilized to advantage in the present invention, in some instances it may be desirable to separate the isomeric xylenes from the ethyl benzene so as to provide a feedstock into the present reaction which is high in metaxylene content.

The formaldehyde which is utilized in the present invention can be obtained and used in a number of different forms. Solid paraformaldehyde or gaseous formaldehyde are preferred embodiments since they are more conveniently handled than the other materials. However, various formalins (from 37 to 55 weight percent aqueous solutions of formaldehyde), trioxane (the cyclic trimer), etc., may be utilized as the source of the formaldehyde.

The acid catalyst which is used in the condensation reaction is sulfuric acid in an aqueous solution having a concentration of 20 to 80 weight percent, preferably a concentration of 40 to 60 weight percent. Other acid catalysts which may be employed to advantage in the present invention include formic acid, trifluoroacetic acid, and various aromatic sulfonic acids.

When reacting toluene as the aromatic hydrocarbon, it is preferred to utilize the catalyst system including 0.2 to 2.0 parts by weight of 60% to 80% aqueous sulfuric acid and one part by weight of a monocarboxylic acid such as formic acid, acetic acid, propionic acid, butyric acid, etc. The preferred catalyst system will comprise 0.3 to 1.0 part by weight of 70 weight percent concentration $H_2SO_4$ to one part by weight of glacial acetic acid.

In the condensation reaction, the aromatic hydrocarbon, formaldehyde, and acid catalyst system can be admixed and reacted either in a batch or continuous manner. Thermosetting resins have been produced by both methods. In the batch system, however, where xylenes are employed as feed, it is preferred to add the sulfuric acid catalyst slowly into the reaction zone wherein the xylene and formaldehyde have been previously admixed (and are maintained at reaction conditions under conditions of moderate to high agitation). The addition of sulfuric acid can take place at a uniform rate over an extended period of time, for example, from 1 to 4 hours. Where toluene is being employed as the aromatic reactant, the toluene, paraformaldehyde, and acetic acid are mixed and the sulfuric acid slowly added. For reasons of economy, however, the batch system is not preferred.

Figure 1:
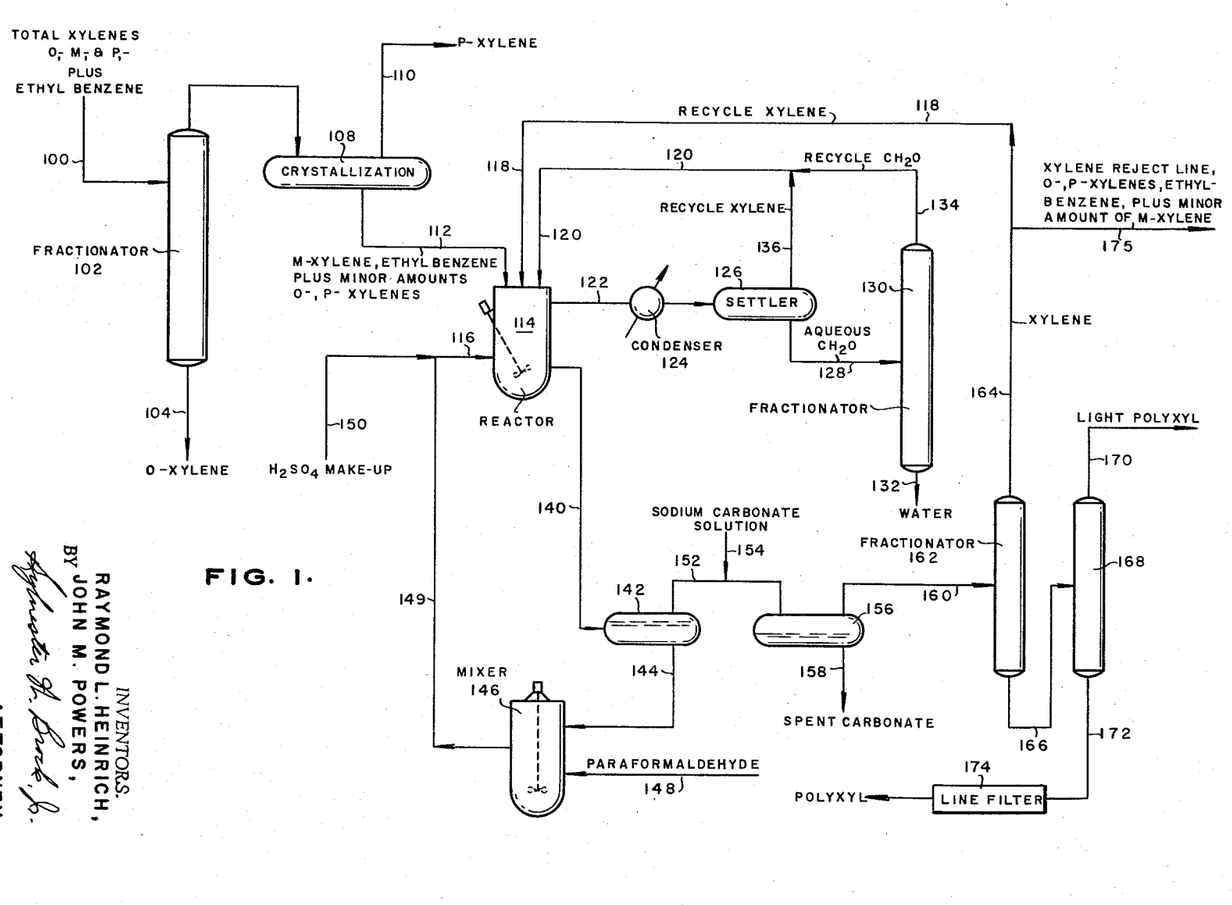
FIG. 1 is a flow diagram of a preferred mode of carrying out the present invention utilizing a continuous system and a stirred reactor.

FIG. 1 shows a prefered embodiment which utilizes a continuous reaction, wherein a stirred reactor is continuously fed an aromatic hydrocarbon such as a metaxylene feedstock and the sulfuric acid recycle stream is utilized as a carrier for the paraformaldehyde feed. Continuous streams are withdrawn both of the hydrocarbon phase and of the catalyst phase. Removal of the water formed during the reaction can be obtained by continuous distillation of the catalyst phase.

Using a stirred reactor during continuous runs, as in FIG. 1, the charge rates of the acid, formaldehyde, and aromatic hydrocarbon are adjusted so as to obtain an acid/oil weight ratio in the reaction zone of 0.02 to 5.0, preferably 0.1 to 0.5, and an aromatics/formaldehyde mol ratio of 1.0 to 100.0, preferably 2.0 to 10.0, in the reaction zone. An oil residence time of 0.05 to 4.0 hours, preferably 0.25 to 1.0 hour, and an acid residence time of 0.05 to 4.0 hours, preferably 0.25 to 1.0 hour, are employed. The reaction temperature may vary from 160° F. to 250° F., preferably 190° F. to 220° F., and pressure may be subatmospheric, atmospheric, or superatmospheric, preferably 0 to 15 p.s.i.g., so long as the reactants are maintained in the liquid phase.

Figure 2:
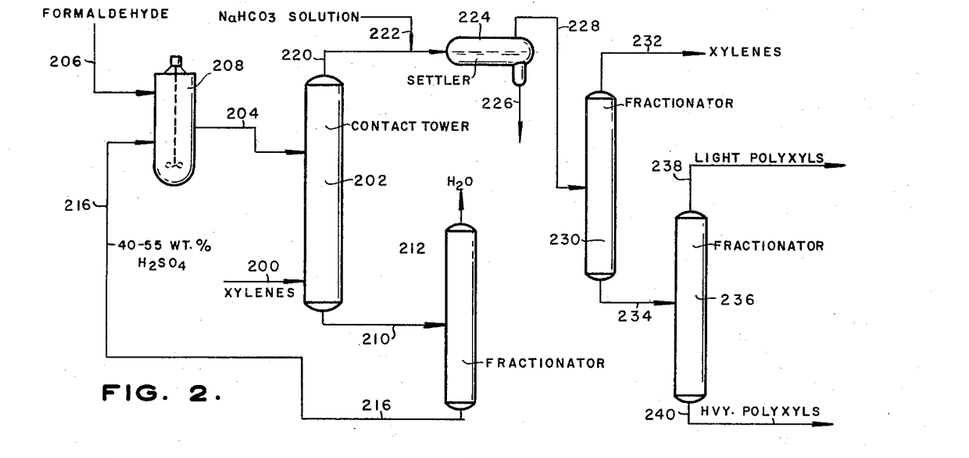
FIG. 2 illustrates an alternate system utilizing a countercurrent column as a reactor instead of the stirred reactor.

When a continuous, countercurrent column is employed as a reactor, as in FIG. 2, the same aromatic hydrocarbons and catalyst systems may be employed as are used in the scheme of FIG. 1. The aromatic hydrocarbon, acid catalyst, and formaldehyde are charged at rates to provide an acid/oil weight ratio of 0.2 to 2.0, a hydrocarbon residence time of 3 minutes to 8 hours, and an aromatic/formaldehyde mol ratio of 0.6 to 2.0. Reaction temperature is preferably somewhat lower but the pressure is generally the same as in the stirred reactor of FIG. 1, a temperature of 70° F. to 120° F. being preferred. Higher temperatures can be used, however. Reactor pressure should be such as to maintain the reactants in the liquid phase.

The reaction between the aromatic hydrocarbon and the formaldehyde produces a number of products. By NMR (Nuclear Magnetic Resonance) spectra, infrared absorption, chemical reactivity, etc., a number of compound types have been identified. These include:

1. Hydrocarbons: $Ar-CH_2-Ar$
2. Diaryl ethers: $Ar-CH_2-O-CH_2-Ar$
3. Acetals: $Ar-CH_2O(CH_2O)_xCH_2-Ar$ ($x$ is predominantly 1, but some compounds in which $x$ is 2 occur as due traces of compounds in which $x$ is 3, 4, etc.).
4. Alcohols and dialcohols: $Ar-(CH_2OH)_y$ ($y$ is predominantly 1 at low conversions but increasing amounts of compounds wherein $y$ is 2, 3, etc., occur at higher conversions).
5. Methyl-aryl ethers: $Ar-CH_2OCH_3$
6. Carbonyls:

In each of the above, Ar can be any methylated aromatic hydrocarbon radical such as toluyl, xylyl, etc., as hereinabove set forth. Only minor amounts of the methyl ether and carbonyl functionalities have been found to be present. The acetal functionality is present in substantial quantities and with the diaryl ether represents the greatest source of oxygen in the total product. These functionalities are very reactive and are probably responsible for the thermosetting properties of the resin. The diaryl ether and acetal functionalities are easily degraded in the presence of an acid catalyst at high temperatures, however, and, therefore, the distillation to recover the higher molecular weight material is preferably carried out by vacuum distillation after neutralizing residual acidity by addition of a basic compound, such as sodium bicarbonate ($NaHCO_3$).

The various functionalities are present in the resin in varying degrees and in all possible combinations. Thus, a small portion may be entirely hydrocarbons, for example, or hydrocarbons with any or all of the other functionalities. Taking a xylenes feedstock as an exemplary aromatic hydrocarbon, some higher molecular weight entities may exhibit a structure similar to the following:

Polyfunctional 2, 3, and 4 ring compounds possessing two or more of the connecting functionalities or of the terminating functionalities in various combinations comprise the bulk of the products.

In addition to the connecting or terminating functionalities found in the Polyxyls, the Polytols prepared by use of a catalyst containing acetic acid contain the acetic acid esters corresponding with the various alcohols and glycols found in the products prepared in the absence of acetic acid. In general, the esters comprise a larger part of the Polytol products than the alcohols and usually the combined ester and alcohol functionalities in the Polytols are far in excess of the total alcohol functionality in the Polyxyls.

In general, the thermosetting resin product from toluene- or xylene-formaldehyde condensation has been found to be a resin product boiling above about 600° F. (temperature corrected to 760 mm. Hg pressure; distillation accomplished at 20 mm. Hg pressure), which has a molecular weight of about 300 to 600 (generally about 350 to 500) and an oxygen content of 8 to 12 weight percent for the Polytols and 12 to 18 weight percent for the Polyxyls. Viscosity of the Polytols varies from about 40 to 150 SSU at 210° F.; for Polyxyls, from about 100 to 500 SSU at 210° F. Much higher viscosities and molecular weights can be obtained when desirable by suitable control of reactant proportions and reaction conditions. Oxygen content as a rule decreases with increase in molecular weight and viscosity.

In comparing the resins of the present invention with xylene-formaldehyde resins of lower oxygen content, IR and NMR studies were made which led to the following probable hydrogen distribution in the resin products:

TABLE I.—COMPARISON OF POLYXYLS

| Inspection Data | Polyxyl AF 408 | Polyxyl AF 415 | Nikanol H |
|---|---|---|---|
| Wt. Percent O₂ | 14.8 | 13.5 | 10.0 |
| Wt. Percent Hydroxyl (Chemical Analysis) | 1.4 | 1.5 | |
| Boiling Range, ° F. (Corrected to 760 mm.) | (¹) | 686+ | |
| Specific Gravity, 60/60° F | 1.077 | 1.089 | |
| Viscosity, SSU at 210° F | 239 | 348 | |
| Molecular weight, Avg | 530 | 570 | 550 |
| Hydrogen Distribution, Percent | | | |
| Ar—CHO | IR | IR | IR |
| Aromatic Ring | 16.8 | 17.0 | 18.6 |
| —O—CH₂—O— | ² 14.1 | ² 12.1 | |
| Ar—CH₂—O—Aliphatic | ² 14.4 | ² 14.8 | 18.0 |
| Ar—CH₂—OH | Some | Some | Some |
| Ar—CH₂—Ar | 4.4 | 5.4 | 7.7 |
| CH₃—O—Aliphatic | 1.4 | 2.1 | 4.9 |
| C—CH₃—Ar | 0.6 | 1.3 | 1.3 |
| CH₃—Ar | 46.2 | 45.0 | 46.8 |
| CH₃—C—Ar | 0.9 | 2.0 | 2.0 |
| —OH | IR | IR | IR |
| Unidentified | 1.2 | 1.3 | 0.7 |

¹ Bottoms recovered by steam distillation at atmospheric pressure to 200° C. bottoms temperature and 25 to 1 water-to-oil volume ratio in overhead.
² These bands overlapped greatly. Individual values are estimates but the total (14.1+14.4) is reliable.

IR—Presence indicated by IR but quantitative measurement not attempted. Not measurable in NMR spectrum.

The Nikanol H is a commercial xylene-formaldehyde resin which is typical of the low-oxygen resins of the prior art.

Figure 4:
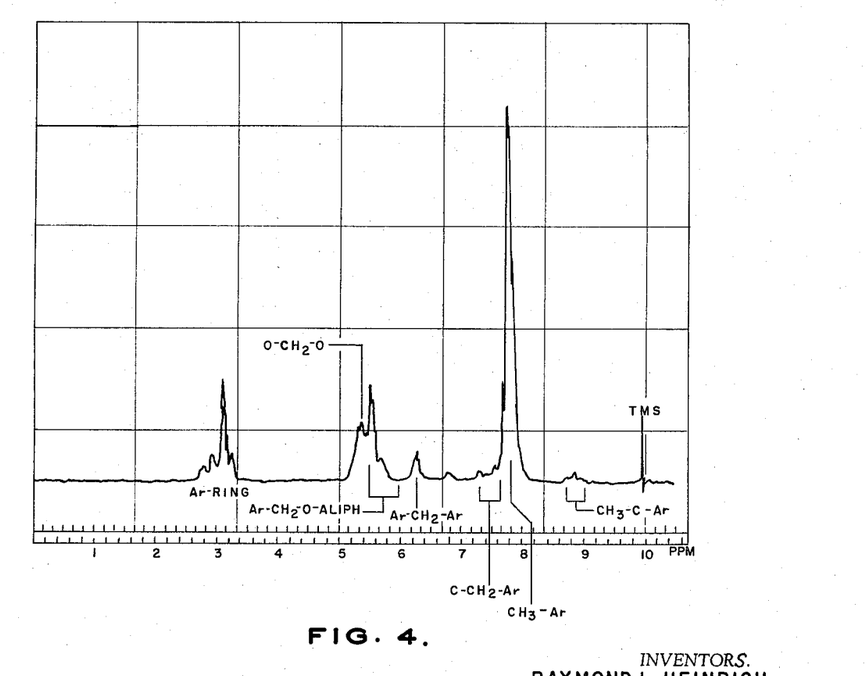
FIG. 4 is an NMR chart derived from a typical Polyxyl product.

A typical NMR spectrum of a Polyxyl is shown in FIG. 4.

Figure 3:
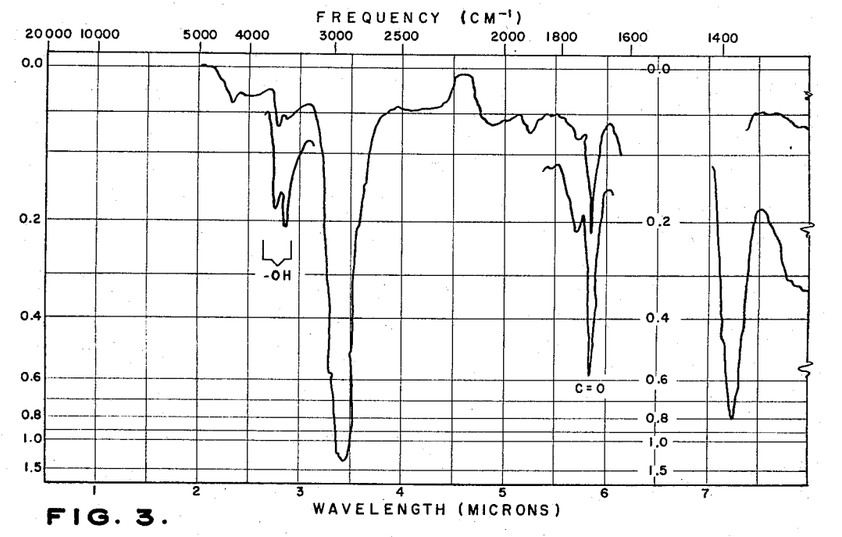
FIGS. 3 and 3A are an infrared curve derived from a typical Polyxyl product.
Figure 3A:
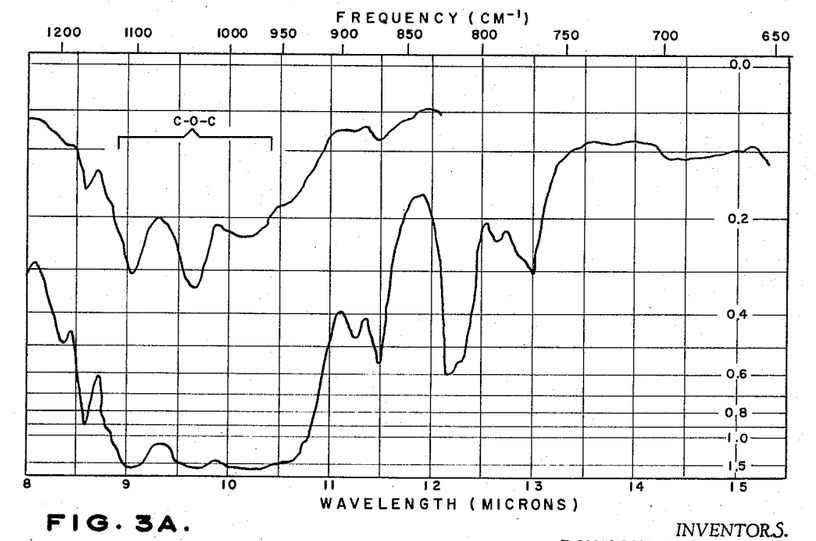

Analysis by infrared is significant only in determining the presence, semiquantitatively, of the hydroxyl (—OH) group. A typical IR spectrum of a Polyxyl is shown in FIG. 3. The absorption peak at 3500 cm.$^{-1}$ is indicative of the hydroxyl group. The infrared spectrum is similar to Nikanol H as is shown below.

TABLE II.—INFRARED ANALYSIS

| Functional Group: | Absorption Region ($\mu$) | Polyxyl | | Nikanol H |
|---|---|---|---|---|
| | | AF 408 | AF 415 | |
| —OH | 2.91 | P | P | P |
| —C=O | 5.87 | P | P | P |
| —C—O—C— | 9.1 | P | P | P |
| Substitutions: | | | | |
| 1,2,4- | 12.4 | H | H | H |
| 1,2,3- | 13.0 | M | M | M |
| 1,3,5- | 12.1 | L | L | L |
| 1,2,4,5- | 11.5 | M | M | H |
| 1,2,3,5- | 11.8 | N | N | N |

H—high; M—medium; L—low; P—present; N—nil.

Analysis by mass spectroscopy has not proven to be too helpful, since the great variety of compounds can each be broken into fragments during mass spectroscopic analysis. The resultant spectra are not definitive.

The Polyxyl product of the present invention can be identified by its unique physical and thermosetting properties, high oxygen content, high hydroxyl content (revealed by IR and by chemical analysis). From 6% to 25% (preferably 10% to 16%) of the combined oxygen is in the form of hydroxyl groups.

The Polyxyl or the Polytol resin can be admixed with a catalyst such as 50 to 90 weight percent sulfuric acid (preferably 70 to 80 weight percent) or an aromatic sulfonic acid such as xylene sulfonic acid and stored almost indefinitely. From 0.1% to 10% by weight of xylene sulfonic acid may be employed, preferably 0.5 to 4.0 weight percent. When heated at 230° F. to 380° F. (preferably 290° F. to 350° F.) for from 1 to 30 minutes (preferably 2 to 10 minutes), the resin admixed with catalyst will thermoset to produce an infusible solid which is insoluble in all hydrocarbon solvents including boiling acetone. When thermoset at atmospheric pressure, the resultant solid has a foam-like appearance induced by the evolution of formaldehyde gas and steam during the thermosetting reaction. Dense solids may be obtained by absorption or removal of the evolved water and formaldehyde during the thermosetting reaction.

Turning now to FIG. 1, wherein metaxylene is chosen as an exemplary aromatic hydrocarbon, a total xylene stream is obtained from refining operations and is charged by way of line 100 into the fractionator 102. In the fractionator 102, a bottoms stream of orthoxylene is removed by way of line 104 while the ethyl benzene, meta- and paraxylene and remaining orthoxylene are withdrawn by way of line 106 and charged into a low-temperature crystallization zone 108. From the low-temperature crystallization zone, paraxylene is withdrawn as the solid phase by way of line 110, and metaxylene, ethyl benzene, and remaining ortho- and paraxylene are withdrawn by way of line 112. The metaxylene-rich stream in line 112 will contain from 5 to 10 weight percent orthoxylene, from 45 to 55 weight percent metaxylene, from 6 to 12 weight percent paraxylene, and from 25 to 35 weight percent ethyl benzene. An exemplary feedstock will contain 9% orthoxylene, 50% metaxylene, 11% paraxylene, 29% ethyl benzene, and 1% other hydrocarbons. The metaxylene-rich aromatic mixture is charged into a stirred reactor 114 where it is contacted with a recycle sulfuric acid stream introduced by way of line 116, a recycle xylene stream by way of line 118, and a recycle formaldehyde and xylene-combined stream by way of line 120. Additional formaldehyde, introduced as paraformaldehyde into the sulfuric acid recycle stream, is supplied at a sufficient rate to replace formaldehyde reacted in the condensation reactor 114 and lost from the various recovery systems.

In the reactor 114, the relative proportions of the reactants and catalyst which are supplied by all recycle streams and fresh feed streams are such that based on one mol of aromatics reacted to form Polyxyls, from 2 to 10 mols of formaldehyde are charged into the reaction zone. Sufficient sulfuric acid is charged into the reaction zone to make up for physical losses and other losses due to occurrence of side reactions such as sulfonation and reduction. The acid holdup in the reactor is such to provide an acid-to-oil ratio in the range of 0.1 to 0.5.

During the reaction, an overhead vaporous product is continuously withdrawn by way of line 122, passed through the condenser 124 and into the settler 126, wherein it separates into an aqueous phase and an oil phase. The aqueous phase, containing dissolved formaldehyde, is passed by way of line 128 into a fractionator 130, operating at superatmospheric pressure of from 5 to 150 p.s.i.g., preferably at 50 to 100 p.s.i.g., wherein the water is separated from the formaldehyde and is discharged by way of line 132. The recovered formaldehyde is passed back to the reactor as a recycle stream by way of line 134, wherein it may be combined with recycle aromatics removed as an oil phase from the settler 126 by way of line 136, and returned to the reactor by way of line 120 as hereinabove set forth. Alternately, fractionating column 130 may be operated under vacuum at from 5 to 150 mm. Hg absolute, preferably at 10 to 50 mm. Hg absolute. In this case, water is obtained as the overhead product and withdrawn from the operation while a bottoms product containing 25 to 50 weight percent formaldehyde-in-water solution is returned to the reaction zone 114.

A liquid product stream is continuously withdrawn from the reactor by way of line 140, admitted into a settler 142, and separated into an acid phase and an oil phase. The oil phase is withdrawn by way of line 144, and introduced into a paraformaldehyde mixing zone 146. Paraformaldehyde is put into the acid stream by way of line 148 and at least partially dissolved therein by means of the stirred mixer 146. The acid recycle stream is withdrawn by way of line 148 and passed by way of line 116, along with additional sulfuric acid makeup if required, which is introduced by way of line 150, back into the reactor 114. A sulfuric acid feed stream may be provided in order to remove a small portion of the sulfuric acid continuously or intermittently in order to maintain the activity of the catalyst system and prevent buildup in the catalyst of products of side reactions, such as, for example, aromatic sulfonic acids.

Returning now to the settler 142, the oil phase represents the reaction product of the reactor 114 along with unreacted xylene and a certain amount of dissolved gaseous formaldehyde, and dissolved and entrained paraformaldehyde and sulfuric acid. This hydrocarbon phase is withdrawn by way of line 152, contacted with sodium bicarbonate or sodium carbonate solution introduced by way of line 154 to neutralize the acid remaining in the hydrocarbon phase, and introduced into a second settler 156. From the settler 156 thin carbonate solution is withdrawn by way of line 158, and the washed and neutralized hydrocarbon is carried by way of line 160 into a fractionator 162. A third settler may be employed between settler 142 and settler 156 in which the product flowing from settler 142 via line 152 may be subjected to a water wash prior to its introduction into settler 156 for sodium carbonate washing. Rather than washing with sodium carbonate in settler 156, it may be desirable to employ other basic media such as a lime slurry, aqueous ammonia, sodium hydroxide, etc.

In the fractionator 162 a reduced pressure of 10 to 50 mm. Hg absolute, a residence time of 0.05 to 2.0 hours, and a bottom of tower temperature of 200 to 350° F. are employed in order to obtain an overhead xylene stream 164 which is then recycled by way of line 118 into the reaction zone, and a product bottoms stream which is transported by way of line 166, if desired, into a postfractionator 168 wherein the condensation product is separated into a light "Polyxyl" (xylene-formaldehyde resin) stream 170 and a heavy Polyxyl stream 172. A line filter 174 may be employed if desired to remove solid polymer from the bottoms product stream. The bottoms product in the fractionator 168 boils above about 625° F. to 675° F. at 760 mm. Hg, has a specific gravity of 1.06 to 1.12, contains from 10% to 20% combined oxygen by weight, and has a viscosity of 90 to 5,000 SSU at 210° F.; preferably it contains 12% to 18% oxygen and possesses a viscosity of 150 to 1,500 SSU at 210° F.

It is the bottoms product 172 that is most useful as the thermosetting resin of the present invention.

Depending on the amount of aromatics other than metaxylene, a larger or smaller reject stream composed primarily of ortho- and paraxylene plus ethyl benzene with a small amount of metaxylene will be withdrawn from line 164 through line 175.

Alternately, all or part of the stream in line 164 may be directed to the primary feed point of the process into line 100 to be recycled for recovery of additional orthoxylene and paraxylene through fractionation and low temperature crystallization prior to reintroduction to the reaction zone 114.

Turning now to FIG. 2, wherein an alternate form of the present invention is set forth, a xylene feedstock is introduced by way of line 200 into a countercurrent contact tower 202, which may be provided with packing such as burl saddles, Raschig rings, Pan American expanded grating, discs and doughnuts, bubble-cap trays, perforated trays, etc. The xylenes are introduced in the bottom of the tower, and contacted in countercurrent with an acid stream introduced near the top of the tower by way of line 204. The acid stream will contain paraformaldehyde, or another form of formaldehyde, which is introduced by way of line 206 and admixed therewith in the zone 208. The acid is withdrawn from the bottom of the tower by way of line 210, passed through fractionator 212 to remove water by way of line 214, and reconstituted acid is recycled to the reaction zone by way of line 216 and the formaldehyde charge zone 218.

The hydrocarbon product is removed by way of line 220, contacted with sodium bicarbonate solution introduced by way of line 222, and introduced into a settler 224, from whence the spent carbonate solution removed by way of line 226. The effluent hydrocarbon phase from tower 202 may be first subjected to a water wash prior to contacting with sodium carbonate solution in line 220 and settler 224. Rather than sodium carbonate solution, other basic systems may be employed, such as lime slurry, sodium hydroxide solution, aqueous ammonia, etc. The neutralized hydrocarbon is removed overhead by way of line 228 and charged into a fractionator 230 from whence the xylenes are removed by way of line 232 and suitably may be recycled into the reaction zone. The bottoms stream from the fractionator 230 is charged by way of line 234 into a second fractionator 236, from whence a light Polyxyl product is recovered by way of line 238 and a heavy Polyxyl product is recovered by way of line 240.

In the embodiment shown in FIG. 2, the oil residence time within the tower 202 may vary from 3 minutes to 8 hours, and the temperature within the tower may vary from 70° C. to 120° C., it being kept in mind that a temperature gradient through the tower may exist, but that the highest temperature should not exceed 120° C. and the lowest temperature should be no less than 70° C. The pressure within the tower should be from atmospheric to 50 p.s.i.g., although as long as the liquid phase is maintained, the pressure is not critical.

The acid-to-hydrocarbon ratio in the reaction zone 202 shall vary from 0.1 to 10.0 by weight, preferably from 0.2 to 2.0, and the ratio of aromatic hydrocarbon to formaldehyde shall vary from 0.6 to 2.0 mols of aromatic per mol of formaldehyde. It is to be noted that where formaldehyde is used in the polymeric form, the basis is one mol of monomeric formaldehyde, $CH_2O$. Although the feedstock into the reaction zone shown in FIGS. 1 and 2 have been exemplarily chosen to be xylenes, it is to be understood that the other aromatic hydrocarbons can also be used. The operating conditions will be within the same limits as those chosen for xylenes regardless of which hydrocarbon is chosen as the feedstock, excepting those conditions such as boiling points and pressures which may necessarily vary with the volatility of the feedstock.

In order to illustrate the present invention, the following runs were made.

*Example 1*

Toluene (4600 g.) paraformaldehyde (91.1%, 1650 g.), and glacial acetic acid (99.9%, 2800 g.) were heated to reflux (about 205° F. to 215° F.) in an 18-liter glass reactor fitted with a stirrer and a reflux condenser. Mol ratio of toluene to formaldehyde is 1.0. Sulfuric acid (70% by weight, aqueous) was added to the refluxing reactants over a period of one hour, a total of 1290 g. being added. The reactants were held at the reflux temperature for an additional 8 hours (total reaction time 9 hours) and the reaction mixture was allowed to cool to room temperature. The products separated into an oil phase (5610 g. after water washing) and an acid phase (4390 g. including material removed from oil phase by water washing).

A 3937 g. portion of the water-washed oil phase was steam distilled to a 200° C. (392° F.) bottoms temperature at atmospheric pressure and a 50/1 water-to-oil volume ratio in the overhead. The remaining 1136 g. of bottoms material (28.9 weight percent of the total oil phase) was a viscous, light yellow liquid having a specific gravity (60/60° F.) of 1.075 and a viscosity of 50.6 SSU at 210° F., 527 SSU at 100° F. Oxygen content was 9.5 weight percent and color was 3 on the Gardner scale. Molecular weight was 352.

On heating 10 grams of this material with 0.1 g. of 70 weight percent $H_2SO_4$ in a test tube, first to 310° F. and then to 330° F., considerable foaming occurred and, on further heating to a somewhat higher temperature, about 360° F., the contents of the test tube solidified.

On heating 5 g. of the same bottoms material with 0.1 g. of 70 weight percent $H_2SO_4$ in a test tube immersed in a 400° F. oil bath, there was quickly obtained a solid, foamy, thermoset material which was insoluble in hydrocarbon solvents and infusible.

*Example 2*

Toluene (182 lbs.), paraformaldehyde flake (91.0%, 65.4 lbs.), and glacial acetic acid (99.8%, 111.0 lbs.) were heated to about 195° F. to 200° F. in a 100-gallon glass-lined steel autoclave equipped with a stirrer. Sulfuric acid (70.3% by weight, aqueous) was pumped into the autoclave in approximately 5 lb. increments over a period of one hour; a total of 52.0 lbs. of acid was added. The reactants were then stirred and heated further for an additional 6 hours (total reaction time 7 hours). Temperature during this period of 7 hours ranged from 195° to 222° F., pressure in the autoclave ranged from atmospheric to 10 p.s.i.g.

The stirring and heating were stopped after 7 hours and the contents of the autoclave were allowed to settle while cooling to 180° F. The bottom phase (acid or catalyst phase) was drawn off and the remaining oil phase was then washed four times with increments of 40 lbs. of water at 180° F. The water-washed oil phase was then drawn off and weighed. Recovery was 413.0 lbs., representing a yield of of 124.8 weight percent of the toluene charge corrected for material balance. (Material balance in this run was 100.8 weight percent recovery of the total materials charged to the autoclave.)

The recovered oil phase possessed a specific gravity (60/60° F.) of 1.005, oxygen content was 7.11 weight percent, and color was 2+ Helige.

Steam distillation at atmospheric pressure of 6500 g. of the oil phase (to 200° C. bottoms temperature and 25 to 1 water-to-oil ratio in the overhead) resulted in a yield of 25.6 weight percent of bottoms consisting of a yellow viscous oil. The bottoms fraction possessed a specific gravity of 1.077 (60°/60° F.); oxygen content 9.9 weight percent; viscosity, 48.6 seconds Saybolt Universal at 210° F., 448 seconds Saybolt Universal at 100° F.; color 4 Helige.

This bottoms fraction obtained by steam distillation was identical in thermosetting properties to the bottoms fraction of Example 1.

Vacuum distillation of the total product from Example 2 was carried out at 20 mm. of mercury absolute pressure, 15 actual plates, and 0.5 to 1.0 reflux ratio, charging 3500 cc. Properties of overhead and bottoms fractions obtained are shown below:

The 730° F.+ bottoms from this example thermosets in similar fashion to the 625° F.+ fraction. The 625° F. to 730° F. fraction above does not thermoset alone under the same conditions.

Substitution of 0.1 g. of 70% sulfuric acid for the 0.4 g. of toluene sulfonic acid in the formulation results in almost identical thermosetting behavior.

The 625° F. to 730° F. fraction of Example 2 is composed primarily of dicyclic esters (about 80 weight percent) and dicylclic alcohols (about 20 weight percent) of the structures:

ESTERS

ALCOHOLS

The methyl group on the first ring is located predominantly in any of the available positions ortho or para

TABLE III

| | Boiling Range of Fraction, 760 mm., °F. | | | | |
|---|---|---|---|---|---|
| | 150-375 | 375-475 | 475-625 | 625-730 | 730° F.+ Bottoms |
| | Principal Components | | | | |
| | Toluene | Tolyl Alcohols, Tolyl Acetates | Ditolyl Methanes, Tolyl Ethers | Ditolyl Acetates, Ditolyl Alcohols | Complex 3, 4, or more ring compounds (Acetates, Alcohols, Ethers) |
| Vol. Percent of Total Oil Product | 18.7 | 11.4 | 35.9 | 14.5 | 19.5 |
| Wt. Percent of Total Oil Product | 16.2 | 11.8 | 35.6 | 15.4 | 21.0 |
| Spec. Grav., 60/60° F | 0.868 | 1.037 | 0.990 | 1.062 | 1.074 |
| Viscosity, SSU, 210° F | | | | | 62 |
| Oxygen Content, wt. percent | 2.6 | 14.0 | 3.4 | 10.5 | 9.2 |
| Hydroxyl Content, wt. percent | 0.08 | 1.19 | 0.15 | 0.83 | 0.58 |
| Color, Gardner | 1+ | 1+ | 1+ | 1+ | 6 |

The combined 625° F. to 730° F. cut and 730° F.+ bottoms possessed a color of 4; viscosity at 210° F., SSU, 43; viscosity at 100° F., SSU, 230; oxygen content 10.2 weight percent; specific gravity (60/60° F.), 1.064. This fraction, boiling at 625° F.+, was admixed in the ratio of 5 g. to 0.4 g. with xylene sulfonic acid and placed in a 100 cc. beaker immersed to a depth of 1.5 to 2 inches in an oil bath held at 35° F. After 1, 2, and 3 minutes, respectively, the contents of the beaker were clear and boiling slowly (evolving primarily water and some formaldehyde). After 4 minutes the liquid contents of the beaker were darker in color than originally and more viscous. After 5 minutes the liquid contents were very viscous and dark brown in color. After 5 minutes and 5 seconds the contents of the beaker foamed up very quickly to form a rubbery foam, occupying approximately 5 to 10 times the volume of the original liquid after 5 minutes and 30 seconds. After a total of 10 minutes at 350° F., the foam was still somewhat rubbery but firmer than at 5 minutes and 30 seconds. On cooling to 80° F. this foam was hard rather than rubbery. The foam product burned slowly in the flame of a Bunsen burner without melting. Toluene, acetone, water, and other solvents have no apparent effect on the foam product.

to the methylene bridge. The location of the two substituents on the second ring is more random.

The 730° F.+ bottoms product of Example 2 is composed predominantly of 3- and 4-ring structures, with minor amounts of structures of 5 or more rings. Structure of these ring systems may vary from pure aromatic hydrocarbon to all substituted rings.

Analysis of this product indicates the following average structures for the 3 and 4 carbon atom compounds, respectively:

C=1.93    —CH₂— groups per molecule
    0.07    —CH₂—O—CH₂— groups per molecule
D=9.88    —H atoms per molecule
    3.00    —CH₃ groups per molecule
    0.13    —CH₂—OH groups per molecule
    0.99    —CH₂—O—CO—CH₃ groups per molecule C = 2.90 —CH$_2$— groups per molecule
0.10 —CH$_2$—O—CH$_2$— groups per molecule
D = 12.50 —H atoms per molecule
4.00 —CH$_3$ groups per molecule
0.17 —CH$_2$—OH groups per molecule
1.33 —CH$_2$—O—CO—CH$_3$ groups per molecule

*Example 3*

A 5-gallon stirred reactor was charged with 12,210 g. (115 mols) of mixed xylenes and 3036 g. (92 mols) of paraformaldehyde (91% formaldehyde equivalent), and heated to 190° F. To this mixture 1518 g. of 50 weight percent aqueous H$_2$SO$_4$ were added at a uniform rate over a period of 2½ hours. The mixed xylenes charged to the reactor had a composition of:

| | Vol. percent |
|---|---|
| o-Xylene | 10.1 |
| m-Xylene | 52.6 |
| p-Xylene | 10.2 |
| Ethylbenzene | 25.8 |
| Other | 1.3 |
| | 100.0 |

During the 2½ hour addition of H$_2$SO$_4$, and for an additional half hour, the reaction mixture was agitated and maintained at a temperature of 190° F. to 208° F. At the end of a total reaction time of 3 hours, the reaction mass was cooled to room temperature and separated into a hydrocarbon phase and an acid phase. A part of the hydrocarbon phase was steam distilled after water washing to remove residual acid. Steam distillation was continued to a 25 to 1 water-to-oil ratio and 200° C. bottoms temperature at atmospheric pressure (760 mm.).

The xylene-formaldehyde condensation product obtained as a bottoms fraction from the distillation possessed the inspections shown below:

| | |
|---|---|
| Weight percent of total oil phase | 25.3 |
| Molecular weight | 510 |
| Spec. grav., 60/60° F. | 1.097 |
| Oxygen content, weight percent | 16.1 |
| Viscosity, SSU, 210° F. | 150 |
| Color, Gardner | 1 |

Another part of the hydrocarbon or oil phase was vacuum distilled at 20 mm. of mercury absolute pressure. Inspections of the fractions obtained and yields of the products are shown in Table IV. Vacuum distillation was carried out in the presence of sodium bicarbonate.

Both the bottoms fraction from steam distillation and that from vacuum distillation thermoset to infusible solids in the presence of about 0.2 g. sulfuric acid (50% or 70% concentration) per 5 g. of product when mixed vigorously at 350° F.

*Example 4*

The procedure of Example 2 was followed in reacting xylenes with formaldehyde in a 100-gallon stirred reactor. A xylenes feedstock was utilized which had the following composition:

| | Wt. percent |
|---|---|
| o-Xylene | 8.7 |
| m-Xylene | 50.6 |
| p-Xylene | 10.8 |
| Ethylbenzene | 29.3 |
| Other | 0.6 |
| | 100.0 |

The xylenes (500 lbs.) and paraformaldehyde (124 lbs.) were mixed in the reactor and heated to about 195° F. Then 62 lbs. of 50 weight percent aqueous H$_2$SO$_4$ were added at a uniform rate over a period of 2½ hours, after which the reaction was continued for an additional 1½ hours for a total reaction time of 4 hours.

After a product work-up, including water washing and vacuum (20 mm. Hg) distillation, a resin was obtained having the inspection data set forth in Table IV. Approximately 0.5 weight percent sodium bicarbonate was added to the product before subjecting it to vacuum distillation.

*Example 5*

The same xylenes feedstock and procedure as were used in Example 4 were utilized in this run. However, the reaction time was extended to a 3½ hour acid addition time and a total reaction time of 10 hours, while the aromatic/formaldehyde mol ratio was increased to 1.0. The hydrocarbon product was vacuum distilled with approximately 0.5 weight percent NaHCO$_3$ added to prevent decomposition during distillation. The solid NaHCO$_3$ was filtered from the bottoms product prior to inspection.

Product inspection data is shown in Table IV. Note that the longer residence time and greater acid-to-oil ratio increased the yield of the desired 665° F.+ material from 14.3 weight percent of the hydrocarbon product to 34.8 weight percent without deleteriously affecting the oxygen content.

*Example 6*

A 30-inch deep, 1–1.4 inch inside diameter glass column, packed full with glass rings measuring one-fourth inch in diameter and one-fourth inch long, was used as the reactor in the production of a xylene-formaldehyde resin.

The xylene feedstock was a mixed xylene stream produced in normal refinery operations, and had the following composition:

| | Wt. percent |
|---|---|
| o-Xylene | 6.1 |
| m-Xylene | 50.8 |
| p-Xylene | 5.9 |
| Ethylbenzene | 37.2 |

The formaldehyde was used in the form of paraformaldehyde dissolved in 50 weight percent aqueous sulfuric acid. The sulfuric acid stream had the following composition:

| | Wt. percent |
|---|---|
| H$_2$SO$_4$ | 41.1 |
| Paraformaldehyde | 17.4 |
| Water | 41.5 |
| | 100.0 |

The sulfuric acid stream was continuously introduced into the top of the column at a rate of 206 g./hr., while the xylene stream was continuously introduced into the bottom of the column at the rate of 342 g./hr. Under these conditions, the hydrocarbon (xylene) residence time was 0.12 hour, the hydrocarbon-to-acid weight ratio was 2 to 1, and the aromatic-to-formaldehyde mol ratio was 2.7 to 1. The xylene and acid were heated before adding to the column, and column temperature was maintained at 210° F. to 230° F. throughout a run period of 4 hours.

After the reaction system had reached dynamic equilibrium, samples of the hydrocarbon product were obtained, washed with water, and distilled at 20 mm. Hg pressure in the presence of solid sodium bicarbonate.

The inspection data on the reaction products are shown in comparison with batch runs in Table IV.

TABLE IV.—INSPECTION DATA

| Run | AF 410 | AF 411 | AF 412 | AFC 403 |
|---|---|---|---|---|
| Example | 3 | 4 | 5 | 6 |
| Reactor Type | 5-gal. batch | 100-gal. batch | 100-gal. batch | Glass column |
| Temp., °F | 190–208 | 196–212 | 201–210 | 210–230 |
| Time (hrs.): | | | | |
|   Acid Addition | 2½ | 2½ | 3½ | |
|   Total | 3 | 4 | 10 | |
| Oil Residence Time, Hrs | | | | 0.12 |
| Aromatic/Formaldehyde, Mol Ratio | 0.8 | 0.8 | 1.0 | 2.7 |
| Aromatic Oil | Xylenes | Xylenes | Xylenes | Xylenes |
| | Grams | Pounds | Pounds | Grams/hr. |
| Reactor Charge: | | | | |
|   Aromatics | 12,210 | 500 | 382 | 342 |
|   Paraformaldehyde, 91% | 3,040 | 124 | 119 | 36 |
|   50% H$_2$SO$_4$ | 1,520 | 62 | 80 | 170 |
| Product Inspection, Total Oil Product: | | | | |
|   Wt. Percent of Xylenes Feed | 116.1 | 115.1 | 118.9 | 107.4 |
|   Sp. G. 60/60 | 0.942 | 0.904 | 0.946 | 0.889 |
|   Wt. Percent O$_2$ | 5.8 | 3.7 | 6.6 | 2.5 |
|   Color, Helige | 1 | 1 | 1 | 4 |
| IBP–350° F.: | | | | |
|   Volume Percent | 70.8 | 83.8 | 62.8 | 84.3 |
|   Wt. Percent | 66.1 | 80.9 | 58.1 | 81.3 |
|   Sp. G. 60/60 | .872 | .870 | .869 | .867 |
|   Wt. Percent O$_2$ | 1.0 | 0.6 | 0.1 | 0.2 |
| 350–525° F.: | | | | |
|   Volume Percent | 2.4 | 2.8 | 3.1 | 2.7 |
|   Wt. Percent | 2.6 | 3.1 | 3.3 | 3.2 |
|   Sp. G. | 0.993 | 1.001 | 1.011 | |
|   Wt. Percent O$_2$ | 11.9 | 13.4 | 13.8 | 13.4 |
| 525–665° F.: | | | | |
|   Volume Percent | 2.7 | 1.5 | 3.6 | 2.7 |
|   Wt. Percent | 2.9 | 1.7 | 3.8 | 3.2 |
|   Sp. G. | 0.982 | 0.982 | 0.996 | |
|   Wt. Percent O$_2$ | 13.1 | 4.9 | 4.1 | 14.0 |
| 665° F.+: | | | | |
|   Volume Percent | 24.1 | 11.9 | 30.5 | 10.3 |
|   Wt. Percent | 28.4 | 14.3 | 34.8 | 12.3 |
|   Sp. G. | 1.102 | 1.079 | 1.070 | 1.082 |
|   Wt. Percent O$_2$ | 15.5 | 16.9 | 15.3 | 12.1 |
|   Color, Gardner | 5 | 9 | 5½ | 14 |
| Vis., SSU at 210° F | 147 | 92 | 149 | 2,485 |
| Mol wt | 510 | | | 677 |
| Hydroxyl, Wt. Percent | 1.6 | | 1.3 | |

*Example 7*

A 5-gram sample of Polyxyl resin from each of the runs of Examples 4 through 6 was admixed with 0.2 g. of xylene sulfonic acid and heated to 350° F. All of the resins thermoset to an infusible, brown, solid foam within a period of about 10 minutes.

Because of the thermosetting ability of the resins obtained by the present process, the inclusion of trace amounts of said catalyst in the resin product tends to catalyze a further reaction during the high temperature distillation of the resin product. It has been found that where formic acid was used as the reaction catalyst, vacuum distillation was very successful. However, where acetic acid-sulfuric acid catalyst, or where sulfuric acid only was used as a catalyst, good quality bottoms products from the distillation zone were not always obtained, even when the product contained relatively low oxygen content. Where the high oxygen content material of the desired resin products was fractionated, the decomposition within the distillation zone was very detrimental and resulted in the production of discolored and non-thermosetting resin. In many cases, brown to black colored low melting point to infusible residues were left in the distillation pot, while a high vacuum within the zone was hard to maintain because of light materials being produced by cracking of the product in the distillation pot.

Steam distillation on a small scale (up to 10 liters charge) avoids the problems which were met in the attempted vacuum distillation of sulfuric acid catalyzed material. The steam distillation was continued to a cut point of 200° C., atmospheric pressure and a 25–50 to one water-to-oil volume ratio in the overhead, which represented an ordinary distillation cut point of about 625° F. to 700° F. top vapor temperature at 760 mm. Hg pressure. In large scale steam distillation, the product quality suffered and was difficult to maintain. Employment of addition of gaseous ammonia to the steam was beneficial. Vacuum distillation, utilizing potassium bicarbonate, sodium bicarbonate, sodium carbonate, sodium tetraborate, disodium phosphate, or other basic material to neutralize acid was the preferred method.

TABLE V

| Run No | AF-411 | | AF-412 | |
|---|---|---|---|---|
| Inspections on Total Product: | | | | |
|   Spec. Grav., 60/60° F | 0.904 | | 0.946 | |
|   Wt. Percent Oxygen | 3.7 | | 6.6 | |
|   Product Yield, Wt. Percent of Arom. Feed | 115.1 | | 118.9 | |
| | Vacuum Dist., Metal Still | 100 Gal. Pfaudler Steam Dist. | Vacuum Dist., Metal Still | 100 Gal. Pfaudler Steam Dist. |
| Inspections on approx. 650° F. + Bottoms from Distillation of Product: | | | | |
|   Spec. Grav., 60/60° F | 1.079 | 1.060 | 1.070 | 1.045 |
|   Wt. Percent Oxygen | 16.9 | 9.8 | 15.7 | 9.8 |
|   Color, Helige | 9 | 9 | 5½ | 5½ |
|   Viscosity, SSU, 210° F | 92 | 381 | 149 | 246 |
|   Bottoms Yield, Wt. Percent of Total Product | 14.3 | 11.4 | 34.1 | 30.3 |

Above in Table V are set forth the results of comparative distillations of the product from Runs AF–411 (Example 4) and AF–412 (Example 5). Note that the oxygen content of the bottoms product is superior in each case when vacuum distillation is used, as compared to steam distillation. Note also that the increased viscosity in the steam-stripping distillation indicates the polymerization of material in the distillation pot. Note also loss in desired bottoms product yield.

Having disclosed in detail the essence of the invention, what is to be covered by Letters Patent should be limited not by the specific examples hereinabove given, but rather only by the appended claims.

We claim:
1. A method of producing a thermosettable aromatic-formaldehyde resin having an oxygen content from 8 to 18 weight percent which comprises:
continuously introducing into a reaction zone an aromatic hydrocarbon chosen from the group consisting of toluene, xylenes, trimethyl benzenes, tetramethyl benzenes, and methylated compounds of the naphthalene and higher condensed ring aromatic series having at least two aromatic hydrogen atoms present on the aromatic ring,
a formaldehyde feedstock chosen from the group consisting of formaldehyde, formalin, paraformaldehyde, and trioxane,
and an acid catalyst chosen from the group consisting of sulfuric acid in an aqueous solution in a concentration of 20 to 80 weight percent, formic acid, trifluoroacetic acid, and aromatic sulfonic acids including xylene sulfonic acid,
the relative proportions of aromatic hydrocarbon, formaldehyde, and acid yielding an acid/oil weight ratio from 0.02 to 10.0, and an aromatic hydrocarbon/formaldehyde mol ratio from 1 to 100,
reacting said aromatic hydrocarbon and formaldehyde in said reaction zone in intimate contact with said acid under reaction conditions including
a residence time of 3 minutes to 4 hours,
a temperature of 70° F. to 250° F., and
a pressure sufficient to maintain the reactants in the liquid phase,
continuously withdrawing from said reaction zone a vaporous product stream comprising water, unreacted aromatic hydrocarbon, and formaldehyde,
condensing said vaporous product, whereby a liquid overhead product is obtained having an aqueous phase and a supernatant aromatic hydrocarbon phase,
recycling said aromatic hydrocarbon to said reaction zone,
fractionating said aqueous phase to obtain a recycle formaldehyde stream,
recycling said recycle formaldehyde stream to said reaction zone,
continuously withdrawing from said reaction zone a liquid product stream comprising acid, unreacted aromatic hydrocarbon, dissolved formaldehyde, and reaction products,
settling said liquid product stream to obtain an acid phase and a hydrocarbon phase,
withdrawing said acid phase and dissolving additional formaldehyde therein,
recycling said acid phase and dissolved formaldehyde to said reaction zone,
withdrawing said hydrocarbon phase,
admixing said hydrocarbon phase with a basic material to neutralize the acid in the hydrocarbon phase,
distilling said neutralized hydrocarbon in a distillation zone in the presence of said basic material at a pressure of 5 to 150 mm. Hg absolute, a residence time of 0.05 to 2.0 hours, and a bottom-of-tower temperature of 200° F. to 250° F.,
and withdrawing a bottoms product boiling above 600° F. corrected to 760 mm. Hg, containing from 8 to 20% combined oxygen, and having a viscosity of 90 to 5000 SSU at 210° F.

2. A method in accordance with claim 1 wherein the acid catalyst is a 20 to 80 weight percent aqueous sulfuric acid, the formaldehyde is a paraformaldehyde solid, the hydrocarbon phase is neutralized with sodium carbonate before vacuum distillation, the vacuum distillation is accomplished at a pressure between 10 and 50 mm. Hg absolute, and the bottoms product has a viscosity between 150 and 1500 SSU at 210° F.

3. A method in accordance with claim 1 wherein an aromatic hydrocarbon recycle stream is recovered from said distillation zone and recycled to said reaction zone.

4. A method of producing a thermosettable xylene-formaldehyde resin having an oxygen content in excess of 13.5 weight percent which comprises
continuously introducing into a reaction zone a xylenes feedstock having as constituents

| | Wt. percent |
|---|---|
| Ethyl benzene | 25–35 |
| o-Xylene | 5–10 |
| m-Xylene | 45–55 |
| and p-Xylene | 6–12 | a formaldehyde feedstock chosen from the group consisting of formaldehyde, formalin, and paraformaldehyde,
and an acid catalyst chosen from the group consisting of sulfuric acid in an aqueous solution in a concentration of 20 to 80 weight percent formic acid, trifluoroacetic acid, and aromatic sulfonic acids,
the relative proportions of xylenes, formaldehyde, and acid yielding an acid/oil weight ratio from 0.02 to 5.0, and an aromatics/formaldehyde mol ratio from 1 to 100,
reacting said xylenes and formaldehyde in said reaction zone in intimate contact with said acid under reaction conditions including
a residence time of 0.05 to 4 hours,
a temperature of 160° F. to 250° F., and
continuously withdrawing from said reaction zone a vaporous product stream comprising water, unreacted xylenes, and formaldehyde,
condensing said vaporous product, whereby a liquid overhead product is obtained having an aqueous phase and a supernatant xylenes phase,
recycling said xylenes to said reaction zone,
fractionating said aqueous phase to obtain a recycle formaldehyde stream,
recycling said recycle formaldehyde stream to said reaction zone,
continuously withdrawing from said reaction zone a liquid product stream comprising acid, unreacted xylenes, dissolved formaldehyde, and reaction products,
settling said liquid product stream to obtain an acid phase and a hydrocarbon phase,
withdrawing said acid phase and dissolving additional formaldehyde therein,
recycling said acid phase and dissolved formaldehyde to said reaction zone,
withdrawing said hydrocarbon phase,
admixing said hydrocarbon phase with a basic material to neutralize residual acid in said hydrocarbon phase,
distilling said neutralized hydrocarbon in a distillation zone in the presence of said basic material at a pressure of 5 to 150 mm. Hg absolute, a residence time of 0.05 to 2.0 hours, and a bottom-of-tower temperature of 200° F. to 350° F.,
and withdrawing a bottoms product boiling above 625° F. corrected to 760 mm. Hg, containing from 10% to 20% combined oxygen, and having a viscosity of 90 to 5000 SSU at 210° F.

5. A method in accordance with claim 4 wherein a xylene recycle stream is recovered from said distillation zone and recycled to said reaction zone.

6. A method in accordance with claim 4 wherein the acid catalyst is a 20 to 80 weight percent aqueous sulfuric acid, the formaldehyde is a paraformaldehyde solid, the hydrocarbon phase is neutralized before distillation with sodium carbonate, the distillation is accomplished at a pressure of 10 to 50 mm. Hg absolute, and the bottoms product withdrawn from the vacuum distillation contains from 12% to 18% combined oxygen and has a viscosity of 150 to 1500 SSU at 210° F.

7. A method in accordance with claim 4 further comprising the steps of adding to said bottoms product from 0.1 to 10.0 weight percent of an acid catalyst chosen from the group consisting of 50 to 90 weight percent aqueous $H_2SO_4$ and aromatic sulfonic acids including xylene sulfonic acid, and thermosetting said bottoms product by heating said bottoms product and said acid catalyst to a temperature of 230° F. to 380° F. for at least one minute.

8. The bottoms product obtained by the method of claim 4.

9. The bottoms product obtained by the method of claim 4 in admixture with from 0.1 to 10.0 weight percent of an acid catalyst chosen from the group consisting of an acid catalyst chosen from the group consisting of 50 to 90 weight percent aqueous $H_2SO_4$ and aromatic sulfonic acids including xylene sulfonic acid.

10. A thermosettable xylene-formaldehyde condensation product obtained by low temperature vacuum distillation in the presence of a basic material of the liquid xylene reaction product with formaldehyde having an oxygen content of 12 to 18 weight percent, from 6% to 25% of said oxygen being present as hydroxyl groups, a specific gravity of 1.06 to 1.12 (60/60° F.), a boiling range of 625+° F. corrected to 760 mm. Hg, a viscosity of 100 to 500 SSU at 210° F., an average molecular weight of 300 to 600, which exhibits an infrared absorbence at 2.91$\mu$, 5.87$\mu$, and 9.1$\mu$, which exhibits an NMR spectrum as set forth in FIG. 4, and which contains both ether and acetal functional groups as indicated by nuclear magnetic resonance.

11. A xylene-formaldehyde condensation product as set forth in claim 10, further comprising from 0.1 to 10 weight percent (based on said product) of an acid catalyst chosen from the group consisting of 50 to 90 weight percent aqueous $H_2SO_4$ and aromatic sulfonic acids, including xylene sulfonic acid.

12. A method of producing a thermosettable aromatic-formaldehyde resin having an oxygen content in excess of 8 weight percent which comprises continuously introducing into a counter-current contacting reaction zone an aromatic feedstock chosen from the group consisting of toluene, xylenes, trimethyl benzenes, tetramethyl benzenes, and methyl-substituted condensed ring aromatics having at least two unsubstituted ring hydrogens, a formaldehyde feedstock chosen from the group consisting of formaldehyde, formalin, trioxane, and paraformaldehyde, and an acid catalyst chosen from the group consisting from 20 to 80 weight percent aqueous sulfuric acid, formic acid, trifluoroacetic acid, and aromatic sulfonic acids including xylene sulfonic acid, the relative proportions of aromatics, formaldehyde, and acid catalyst yielding an acid/oil weight ratio from 0.01 to 10.0, and an aromatics/formaldehyde mol ratio from 0.6 to 2.0, reacting said aromatic hydrocarbon and formaldehyde in said reaction zone in intimate contact with said acid under reaction conditions including a residence time of 3 minutes to 8 hours,
a temperature of 70° F. to 120° F., and
a pressure sufficient to maintain the reactants in the liquid phase, continuously withdrawing from said reaction zone a hydrocarbon stream and a catalyst stream, neutralizing residual acid in said hydrocarbon stream with basic material, and fractionating said neutralized hydrocarbon stream in the presence of said basic material at a pressure of 10 to 50 mm. Hg absolute and a bottom-of-tower temperature of 200° F. to 350° F., to produce a bottoms product boiling above 625° F. corrected to 760 mm. Hg absolute, containing from 12% to 18% combined oxygen, and having a viscosity of 150 to 1500 SSU at 210° F.

13. A method in accordance with claim 12 wherein the aromatic hydrocarbon is an admixture of xylenes.

References Cited

UNITED STATES PATENTS

| | | | |
|---|---|---|---|
| 2,914,579 | 11/1959 | Erich | 260—668 |
| 3,000,859 | 9/1961 | Mirviss et al. | 260—67 |
| 3,035,023 | 5/1962 | Imoto et al. | 260—67 |
| 3,037,877 | 6/1962 | Hutchings | 260—67 |
| 3,178,393 | 4/1963 | Brandt et al. | 260—67 |

L. M. PHYNES, *Assistant Examiner.*

WILLIAM H. SHORT, *Primary Examiner.*